(12) United States Patent
Hirano et al.

(10) Patent No.: US 9,674,133 B2
(45) Date of Patent: Jun. 6, 2017

(54) ELECTRONIC MAIL DELIVERY APPARATUS, ELECTRONIC MAIL DELIVERY METHOD, AND PROGRAM STORAGE MEDIUM

(71) Applicant: QUALITIA CO., LTD., Tokyo (JP)

(72) Inventors: Yoshitaka Hirano, Tokyo (JP);
Ohchang Kwon, Tokyo (JP)

(73) Assignee: QUALITIA CO., LTD., Tokyo (JP)

( * ) Notice: Subject to any disclaimer, the term of this patent is extended or adjusted under 35 U.S.C. 154(b) by 0 days.

(21) Appl. No.: 14/417,317

(22) PCT Filed: Jul. 4, 2014

(86) PCT No.: PCT/JP2014/067890
§ 371 (c)(1),
(2) Date: Jan. 26, 2015

(87) PCT Pub. No.: WO2015/005236
PCT Pub. Date: Jan. 15, 2015

(65) Prior Publication Data
US 2016/0142360 A1    May 19, 2016

(30) Foreign Application Priority Data
Jul. 8, 2013   (JP) ................ 2013-142269

(51) Int. Cl.
*G06F 15/16*    (2006.01)
*H04L 12/58*    (2006.01)
*G06Q 10/10*    (2012.01)

(52) U.S. Cl.
CPC .......... *H04L 51/28* (2013.01); *G06Q 10/107* (2013.01); *H04L 51/30* (2013.01)

(58) Field of Classification Search
CPC ......... H04L 12/58; H04L 51/00; H04L 51/12; H04L 51/22; H04L 51/28–51/30
See application file for complete search history.

(56) References Cited

U.S. PATENT DOCUMENTS

2012/0072519 A1*  3/2012  Oda .................... G06Q 10/107
709/206

FOREIGN PATENT DOCUMENTS

| JP | 2009-15576 | 1/2009 |
| JP | 2009-267497 | 11/2009 |

(Continued)

OTHER PUBLICATIONS

Extended European Search Report issued Jul. 22, 2015 in corresponding European Patent Application No. 14823129.3.
(Continued)

*Primary Examiner* — Brendan Higa
(74) *Attorney, Agent, or Firm* — Staas & Halsey LLP

(57) ABSTRACT

Various embodiments prevent erroneous transmission of electronic mails and therefore forestall information leakage in an electronic mail delivery apparatus. When an electronic mail is to be transmitted, a hidden letter selection unit presents a mail address specified as a transmission destination or source of the electronic mail with a part of the mail address presented as a hidden letter part. If a correct letter is entered in the hidden letter part of the mail address, a selective mail delivery unit executes the transmission of the electronic mail. If a correct letter is not entered in the hidden letter part of the mail address, the transmission of the electronic mail is stopped. Thereby, the effectiveness of operation for mail address checking can be improved, and the checking operation can be prevented from losing substance.

11 Claims, 6 Drawing Sheets

(56) References Cited

FOREIGN PATENT DOCUMENTS

| JP | 2010-134690 | 6/2010 |
|---|---|---|
| JP | 2011-113466 | 6/2011 |
| JP | 2013-101684 | 5/2013 |

OTHER PUBLICATIONS

Japanese Office Action issued Nov. 25, 2014 in corresponding Japanese Patent Application No. 2013-142269.
International Search Report mailed Oct. 7, 2014, in corresponding International Patent Application No. PCT/JP2014/067890.

* cited by examiner

FIG.6

ITEMS TO CHECK abcdefghi.co.jp
<hira☐o@tran☐ware.co.jp>

CHECK ALL DESTINATION MAIL ADDRESSES

⊘ PERMIT  ● DISCARD THIS MAIL

ELECTRONIC MAIL DELIVERY APPARATUS, ELECTRONIC MAIL DELIVERY METHOD, AND PROGRAM STORAGE MEDIUM

CROSS-REFERENCE TO RELATED APPLICATION(S)

This application is a U.S. National Stage Application, which claims the benefit under 35 U.S.C. §371 of PCT International Patent Application No. PCT/JP2014/067890, filed Jul. 4, 2014, which claims the foreign priority benefit under 35 U.S.C. §119 of Japanese Patent Application No. 2013-142269, filed Jul. 8, 2013, the contents of which are incorporated herein by reference.

TECHNICAL FIELD

The present invention relates to an electronic mail delivery apparatus, an electronic mail delivery method, and a program storage medium suitable to be applied, for example, to sending and receiving electronic mails between companies.

BACKGROUND ART

In recent years, with the spread of the Internet, electronic mails have become indispensable as a tool for business communication between companies.

However, when a person belonging to a company sends an electronic mail intended for another company, there may be cases where the electronic mail is inadvertently sent to a wrong destination because of a human factor (error), and important information such as company's know-how or personal information described in a mail text or an attached file is leaked to a third party. This may possibly lead to a serious incident related to the survival of the company.

To avoid inconvenience due to such erroneous transmission of electronic mails, there has been proposed a technique (hereinafter referred to as a publicly known technique 1) which provides a checkbox corresponding to a mail address of a transmission destination, and makes a sender (addresser) check that the mail address is correct, and then allows the transmission of the electronic mail (for example, see Patent Literatures 1, 2).

CITATION LIST

Patent Literature

Patent Literature 1: Japanese Patent Laid-Open No. 2010-134690
Patent Literature 2: Japanese Patent Laid-Open No. 2013-101684

SUMMARY OF INVENTION

Technical Problem

However, in the publicly known technique 1, since an operation for mail address checking is completed only by checking the checkbox, the checking operation loses substance and becomes habitual, so that transmission of the electronic mail may be permitted even if the sender does not actually look at and check the mail address in a careful manner, which may lead to erroneous transmission of the electronic mail.

In view of such circumstances, an object of the present invention is to provide an electronic mail delivery apparatus, an electronic mail delivery method, and a program storage medium which can prevent erroneous transmission of electronic mails and therefore can forestall information leakage, by providing a contrivance to prevent an operation for mail address checking from losing substance at the time of transmission of the electronic mail.

Solution to Problem

To achieve such an object, the inventor has completed the present invention by conceiving that when an electronic mail is to be transmitted, a part of a mail address is set to be a part where a letter is hidden (hereinafter referred to as a hidden letter part), and a sender is made to enter the letter again in the hidden letter part, so that the effectiveness of operation for mail address checking is improved, and the checking operation is prevented from losing substance.

Specifically, an electronic mail delivery apparatus according to the present invention is an electronic mail delivery apparatus that prevents an electronic mail from being delivered with its transmission or distribution destination's mail address mistaken, including: a mail address hidden letter presentation unit to present the mail address with a part of the mail address presented as a hidden letter part; and a selective mail delivery unit to execute delivery of the electronic mail to a receiving server of the electronic mail if a correct letter is entered in the hidden letter part of the mail address, and to stop delivery of the electronic mail to the receiving server of the electronic mail if the correct letter is not entered in the hidden letter part of the mail address.

Desirably, the electronic mail delivery apparatus of the present invention further includes a hidden letter selection unit to select a letter to be set as the hidden letter part by the mail address hidden letter presentation unit, wherein the hidden letter selection unit selects the letter to be set as the hidden letter part such that, in a case where there are a plurality of mail addresses specified as transmission destinations or sources of the electronic mail, each of the plurality of mail addresses is not identical to any other of the plurality of mail addresses even if any letter is entered into a column position expected to be the hidden letter part.

Desirably, the electronic mail delivery apparatus of the present invention further includes a hideable letter extraction unit to, in a case where there are a plurality of mail addresses specified as transmission destinations or sources of the electronic mail, extract, for each of the plurality of mail addresses, one or more hideable letters from a plurality of letters constituting the relevant mail address by a predetermined hidden letter part extraction logic, wherein the hidden letter selection unit selects a letter to be the hidden letter part, from the hideable letters extracted by the hideable letter extraction unit.

Desirably, in the electronic mail delivery apparatus of the present invention, the hideable letter extraction unit extracts all of mail addresses having the same number of letters from the plurality of mail addresses specified as transmission destinations or sources of the electronic mail, and for each of the extracted mail addresses, selects one letter in an arbitrary column position, compares the selected letter with a letter in the same column position of the other mail addresses, sets the selected letter as an unhideable letter if the same letter as the selected letter does not exist with respect to any other mail addresses, and extracts as the hideable letters, a plurality of letters constituting the relevant mail address except the unhideable letter.

Desirably, in the electronic mail delivery apparatus of the present invention, the hideable letter extraction unit repeats operation to change the column position and compare the selected letter with a letter in the same changed column position of the other mail addresses, until determining that the same letter as the selected letter does not exist with respect to any other mail addresses.

Desirably, in the electronic mail delivery apparatus of the present invention, the hideable letter extraction unit extracts all of mail addresses having the same number of letters from the plurality of mail addresses specified as transmission destinations or sources of the electronic mail, and for each of the extracted mail addresses, selects a combination of n letters (where n is a natural number) in arbitrary column positions, compares the selected combination with a combination of letters in the same column positions of the other mail addresses, sets the selected combination of letters as unhideable letters if the same combination as the selected combination does not exist with respect to any other mail addresses, and extracts as the hideable letters, a plurality of letters constituting the relevant mail address except the unhideable letters.

Desirably, in the electronic mail delivery apparatus of the present invention, operation to change the column positions and compare the selected combination with a combination of letters in the same changed column positions of the other mail addresses, is repeated until it is determined that the same combination as the selected combination does not exist with respect to any other mail addresses.

Desirably, in the electronic mail delivery apparatus of the present invention, operation to increase the number of characters n included in the selected combination and compare the selected combination with a combination of letters in the same changed column positions of the other mail addresses, is repeated until it is determined that the same combination as the selected combination does not exist with respect to any other mail addresses.

According to the present invention, the electronic mail delivery apparatus is desirably provided in an electronic mail delivery server.

In addition, an electronic mail delivery method according to the present invention is an electronic mail delivery method that prevents an electronic mail from being delivered with its transmission or distribution destination's mail address mistaken, including: presenting the mail address specified as the transmission or distribution destination of the electronic mail with a part of the mail address presented as a hidden letter part; and executing delivery of the electronic mail to a receiving server of the electronic mail if a correct letter is entered in the hidden letter part of the mail address, and stopping delivery of the electronic mail to the receiving server of the electronic mail if the correct letter is not entered in the hidden letter part of the mail address.

Further, a program storage medium according to the present invention is a computer readable storage medium in which a computer program is stored, wherein the computer program prevents an electronic mail from being delivered with its transmission or distribution destination's mail address mistaken, by performing: mail address hidden letter presentation processing to present the mail address specified as the transmission or distribution destination of the electronic mail with a part of the mail address presented as a hidden letter part; and selective mail delivery processing to execute delivery of the electronic mail to a receiving server of the electronic mail if a correct letter is entered in the hidden letter part of the mail address, and to stop delivery of the electronic mail to the receiving server of the electronic mail if the correct letter is not entered in the hidden letter part of the mail address.

Advantageous Effects of Invention

According to the electronic mail delivery apparatus of the present invention, when an electronic mail is to be transmitted, a part of a mail address is set to be a hidden letter part by the mail address hidden letter presentation unit, a sender is made to enter the letter again in the hidden letter part, and selective mail delivery unit executes delivery only if the entered letter is correct, so that the effectiveness of operation for mail address checking can be improved, and the checking operation can be prevented from losing substance. As a result, erroneous transmission of electronic mails can be prevented, and therefore information leakage can be forestalled.

In addition, according to the electronic mail delivery apparatus of the present invention, only apart of a mail address (a hidden letter part) needs to be entered at the time of electronic mail transmission. Accordingly, the increased burden on a sender is inhibited compared to a case where a whole mail address is to be entered, and furthermore copy and paste of a mail address can be prohibited unlike the case where the whole mail address is to be entered, so that the operation for mail address checking can be prevented from losing substance, in this regard as well.

In an electronic mail delivery apparatus of the present invention, by providing the hidden letter selection unit, an inconvenience that entering an incorrect letter in a hidden letter part coincidentally corresponds to a different correct mail address can be avoided.

In an electronic mail delivery apparatus of the present invention, the processing is simplified by the hidden letter selection unit selecting a letter to be the hidden letter part from one or more hideable letters extracted by the hideable letter extraction unit.

In an electronic mail delivery apparatus of the present invention, the hideable letter extraction unit selects one letter in an arbitrary column position of an mail address, and sets the letter as an unhideable letter if the letter is not identical to a letter in the same column position of other mail addresses, and sets as the hideable letters, letters constituting the relevant mail address except the unhideable letter, so that letters which a sender can easily determine can be hidden. In addition, the hideable letter extraction unit repeats the same operation while changing the column position, thereby making it easier to determine unhideable letters.

In an electronic mail delivery apparatus of the present invention, the hideable letter extraction unit selects a combination of n letters in arbitrary column positions, and sets the combination of letters as unhideable letters if the combination of letters are not identical to a plurality of letters in the same column positions of other mail addresses, and sets as the hideable letters, letters constituting the relevant mail address except the unhideable letters, so that letters which a sender can easily determine can be hidden. In addition, the hideable letter extraction unit repeats the same operation while changing the column position, thereby making it easier to determine unhideable letters. Further, by repeating the same operation while increasing the number of letters included in the combination, determination of unhideable letters can be ensured.

According to the electronic mail delivery method of the present invention, when an electronic mail is to be transmitted, a part of a mail address is set to be a hidden letter part by the mail address hidden letter presentation unit, a sender is made to enter the letter again in the hidden letter part, and the selective mail delivery unit executes delivery only if the entered letter is correct, so that the effectiveness of operation for mail address checking can be improved, and the checking operation can be prevented from losing substance. As a result, erroneous transmission of electronic mails can be prevented, and therefore information leakage can be forestalled.

In addition, according to the electronic mail delivery apparatus of the present invention, only apart of a mail address (a hidden letter part) needs to be entered at the time of electronic mail transmission. Accordingly, the increased burden on a sender is inhibited compared to a case where a whole mail address is to be entered, and furthermore copy and paste of a mail address can be prohibited unlike the case where the whole mail address is to be entered, so that the operation for mail address checking can be prevented from losing substance, in this regard as well.

According to the program storage medium of the present invention, a computer is allowed to function as an electronic mail delivery apparatus of the present invention.

BRIEF DESCRIPTION OF DRAWINGS

FIG. 6 is a schematic diagram illustrating a screen for checking a mail address specified as a transmission destination of an electronic mail, in the electronic mail delivery system according to the embodiment 1.

DESCRIPTION OF EMBODIMENTS

Hereinafter, embodiments of the present invention will be described.

Embodiment 1

The embodiment 1 of the present invention is illustrated in FIGS. 1 to 6.

First, the configuration will be described.

Figure 1:
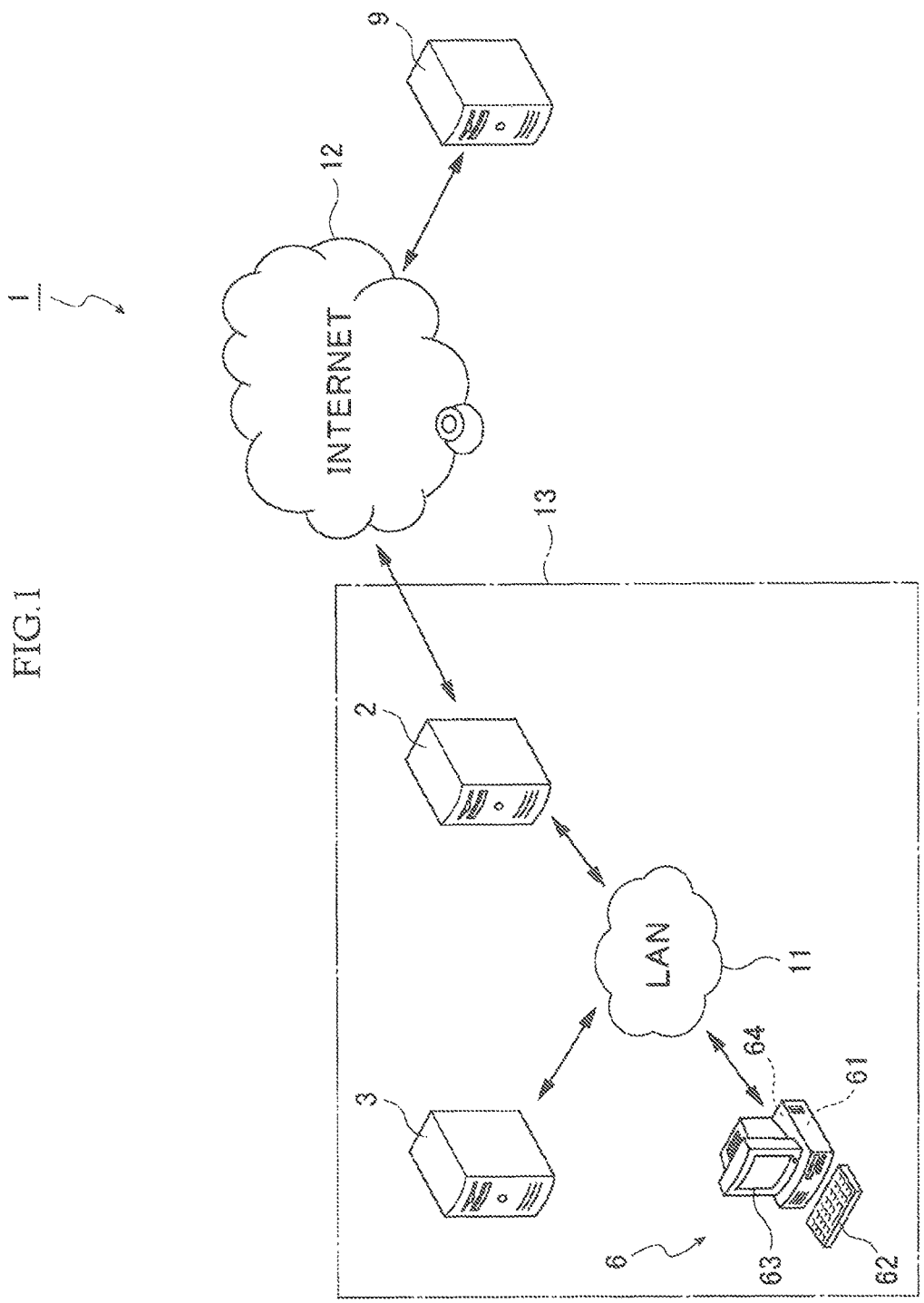
FIG. 1 is a general configuration diagram illustrating an electronic mail delivery system according to an embodiment 1 of the present invention.

As shown in FIG. 1, an electronic mail delivery system 1 has an electronic mail sending server 3 and a plurality of clients 6. These electronic mail sending server 3 and clients 6 are interconnected via a LAN (local area network) 11, and provided in an organization 13 such as a company, a central or local government office, a hospital or a clinic. In FIG. 1, only one of clients 6 is shown, and illustration of other ones is omitted. Each client 6 includes an information processing device 61, an input device 62 such as a keyboard, a display device 63 such as a CRT (cathode-ray tube), and a storage device 64 such as a semiconductor disk, and a mailer (mail client software) is stored in the storage device 64.

In addition, as shown in FIG. 1, the electronic mail delivery system 1 has an electronic mail receiving server 9, which is connected to the Internet 12.

Figure 2:
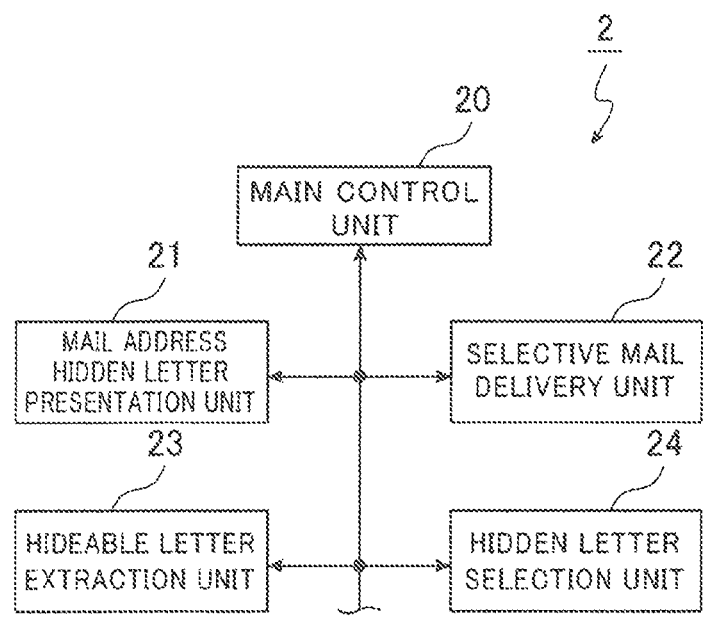
FIG. 2 is a control block diagram of an electronic mail delivery server constituting the electronic mail delivery system according to the embodiment 1.

Further, as shown in FIG. 1, the electronic mail delivery system 1 has an electronic mail delivery server 2, which is provided in the organization 13 as a gateway connecting between the LAN 11 and the Internet 12. As shown in FIG. 2, this electronic mail delivery server 2 includes a main control unit 20, which is connected with a mail address hidden letter presentation unit 21, a selective mail delivery unit 22, a hideable letter extraction unit 23, and a hidden letter selection unit 24.

The operation will be described below.

In the electronic mail delivery system 1 having the above described configuration, when a person belonging to the organization 13 transmits an electronic mail to a plurality of parties (transmission destinations), the sender (person) operates the input device 62 to start the mailer and click a mail creation button (not shown).

Figure 4:
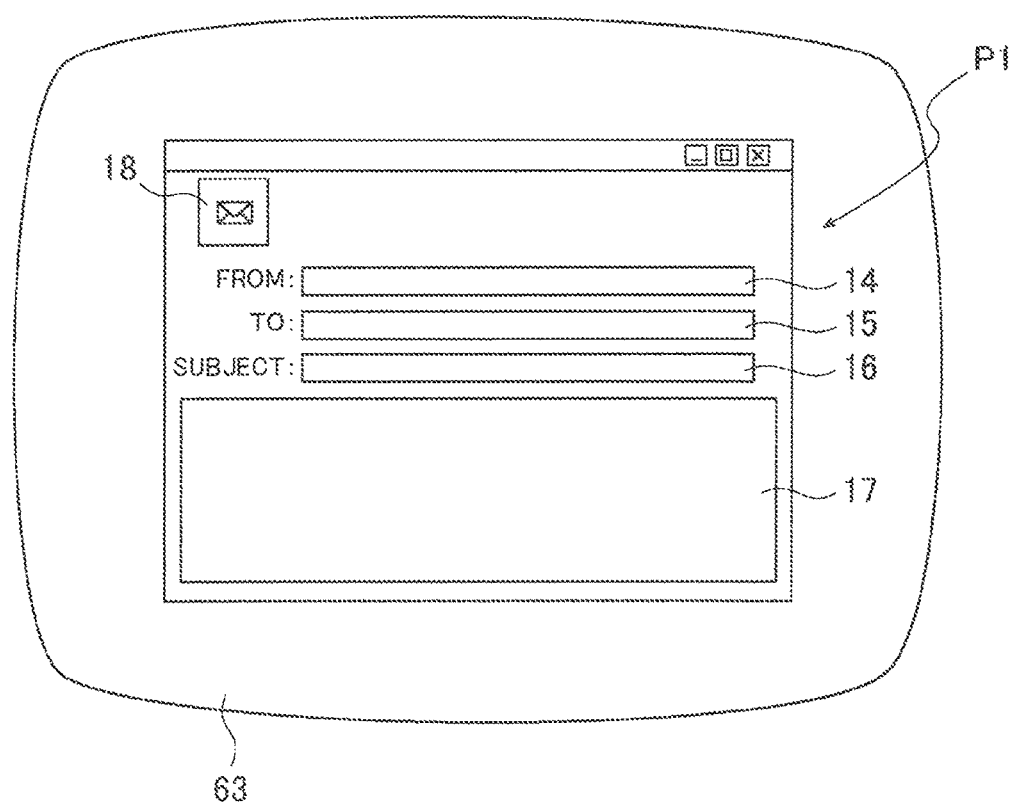
FIG. 4 is a schematic diagram illustrating a mail creation screen of a mailer.

Then, a mail creation screen P1 is displayed as shown in FIG. 4 on the display device 63 of the client 6. This mail creation screen P1 includes a sender field (From field) 14, a destination field (To field) 15, a subject field (caption field) 16, a body field 17, and a send button 18. Then, the sender enters his/her address in the sender field 14 to specify it as the transmission source of the electronic mail, enters a required number (e.g., three) of intended mail addresses in the destination field 15 to specify them as a plurality of transmission destinations of the electronic mail, enters an intended subject in the subject field 16, and further enters a mail body in the body field 17 as appropriate, and after that clicks the send button 18. The client 6 then outputs a mail transmission command together with the above electronic mail information (the mail address of the transmission source, the plurality of mail addresses of the transmission destinations, the subject, the mail body) to the electronic mail sending server 3.

In response to this, the electronic mail sending server 3 outputs the above electronic mail information (the mail address of the transmission source, the plurality of mail addresses of the transmission destinations, the subject, the mail body) to the electronic mail delivery server 2.

Figure 3:
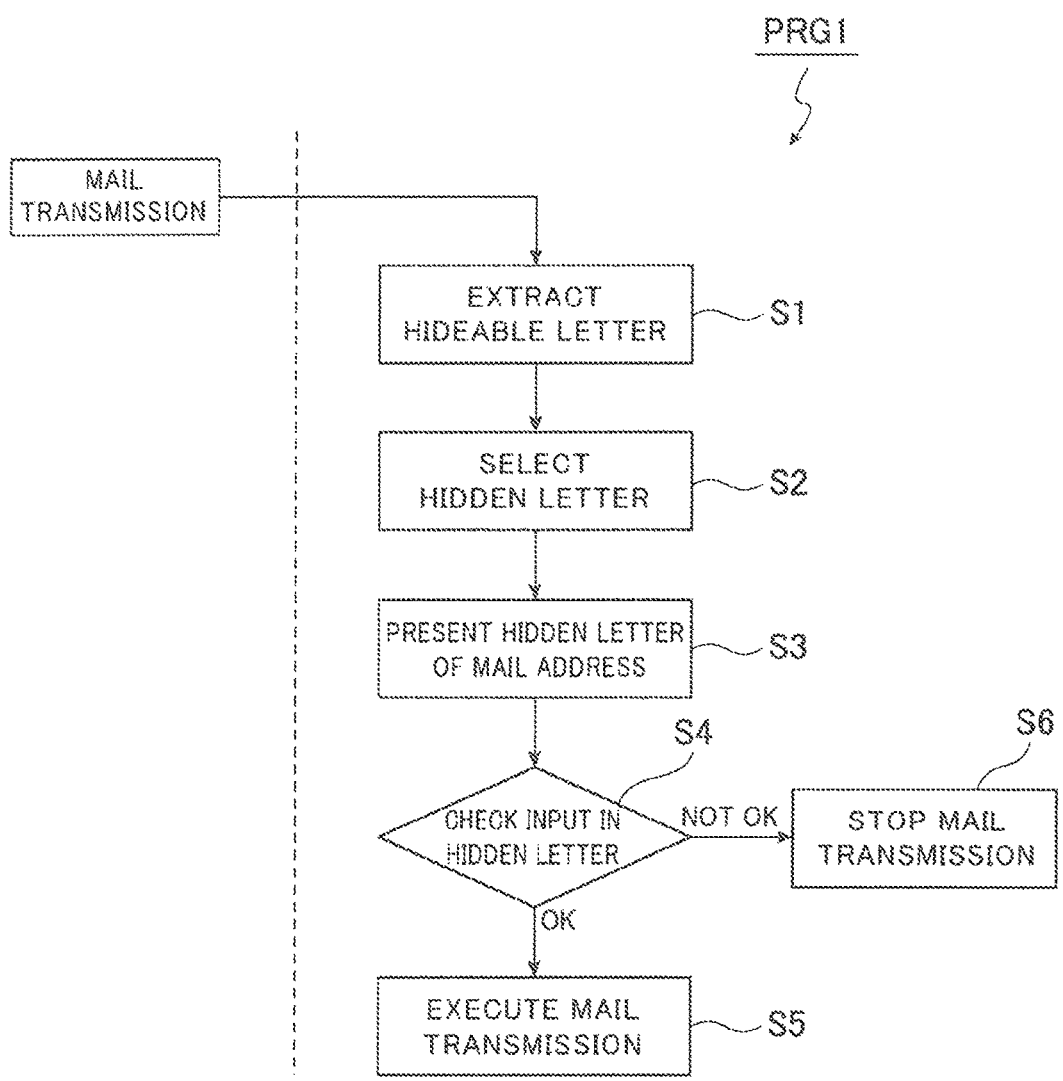
FIG. 3 is a flowchart of an electronic mail delivery program according to the embodiment 1.

In response to this, the electronic mail delivery server 2 performs processing for delivering the electronic mail while excluding erroneous transmission based on an electronic mail delivery program PRG1 shown in FIG. 3 as described below.

First, in a hideable letter extraction step, the main control unit 20 commands the hideable letter extraction unit 23 to extract a hideable letter. In response to this command, the hideable letter extraction unit 23 extracts, for each of the transmission destinations' mail addresses, one or more hideable letters from a plurality of letters constituting the mail address by a predetermined hidden letter part extraction logic (Step S1 of the electronic mail delivery program PRG1).

This hidden letter part extraction logic follows a procedure described below.

First, all of mail addresses having the same number of letters are extracted from a plurality of mail addresses specified as transmission destinations of the electronic mail. Then, for each of the extracted mail addresses, a hideable letter is extracted according to the following procedural steps (1) to (7).

(1) From a target mail address to be processed, one letter in an arbitrary column position (a sequential position of each letter, which is an element of the mail address, within the mail address) is selected.

(2) Then, the selected letter is compared with a letter in the same column position of each of the other mail addresses (mail addresses except for the target mail address among the mail addresses having the same number of letters).

(3) Then, if it is determined that the same letter as the selected letter does not exist with respect to any other mail addresses, the letter in this column position is determined as an unhideable letter. Then, a plurality of letters constituting the mail address except the unhideable letter are extracted as hideable letters.

(4) On the other hand, if it is determined based on the above comparison (2) that the same letter as the selected letter exists with respect to one or more of the other mail addresses, a combination of two or more letters in arbitrary column positions is selected from the target mail address.

(5) Then, this combination of letters is compared with a combination of letters in the same column positions of each of the other mail addresses.

(6) If the same combination does not exist with respect to any other mail addresses, this combination of letters is determined as unhideable letters. Then, a plurality of letters constituting the mail address except the unhideable letters are extracted as hideable letters.

(7) On the other hand, if it is determined based on the above comparison (5) that the same combination of letters as the selected combination of letters exists with respect to one or more of the other mail addresses, similar processing to the above processing of (4) and (5) is repeated while increasing the number of letters included in such a combination (for example, one by one) until unhideable letters are extracted.

A reason why this hideable letter extraction logic is applied only to mail addresses having the same number of letters is that as for mail addresses having a different number of letters, any letter of them can be hidden without the need to apply the hideable letter extraction logic thereto. Further, since no identical addresses are included in a plurality of transmission destinations' mail addresses at the time of electronic mail transmission as a general rule, a situation where any unhideable letter cannot be found to the last does not occur under such an assumption. It is noted that, with respect to one mail address, only one of extracted elements may be an unhideable letter, or some or all of extracted elements may be unhideable letters.

Figure 5:
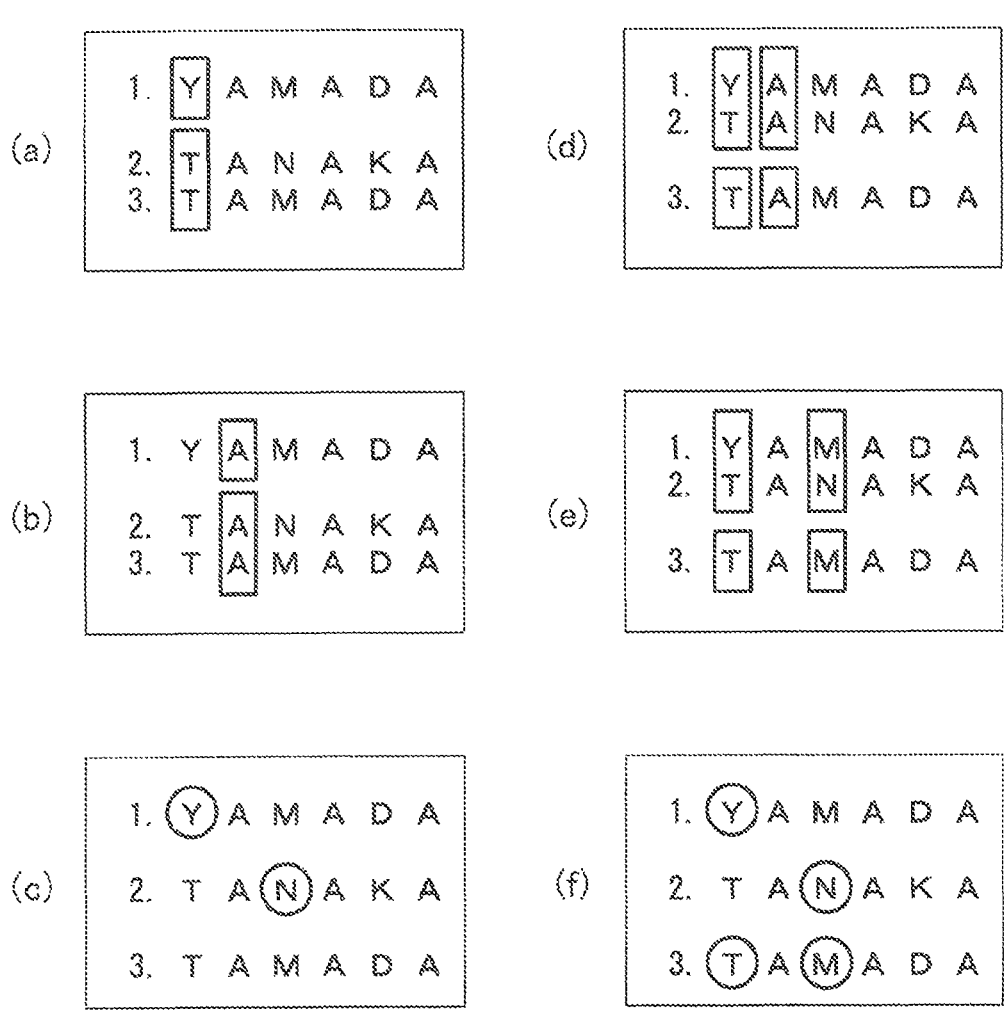
FIG. 5 is a schematic diagram illustrating a procedure for extracting a hideable letter from a mail address specified as a transmission destination of an electronic mail when a part of the mail address is set to be a hidden letter part, in the electronic mail delivery system according to the embodiment 1.

One example of a technique for extracting a hideable letter from a plurality of letters constituting each address using the above described hideable letter extraction logic will be described below. In this example, there are three transmission destinations' mail addresses which have six-letter local parts: "YAMADA", "TANAKA", "TAMADA", respectively, as shown in FIG. 5. In this example, there will be described a case using search conditions: "each mail address is searched sequentially from its first letter (leftmost letter)", "the number of letters to be selected is one at the beginning", and "the number of unhideable letters is one".

First, "YAMADA" is compared with "TANAKA" and "TAMADA" in units of one letter. As a result, since the first letter "Y" of "YAMADA" exists only in "YAMADA", the letter "Y" is set as an unhideable letter (see FIG. 5(a)). Next, since the second letter "A" of "YAMADA" exists aside from "YAMADA" (in "TANAKA" and "TAMADA"), the letter "A" is not set as an unhideable letter (see FIG. 5(b)). Likewise, since third to sixth letters of "YAMADA", that is, "M", "A", "D", "A" exist aside from "YAMADA", any of the letters "M", "A", "D", "A" is not set as an unhideable letter. In the end, the unhideable letter of "YAMADA" is the first letter "Y" (see FIG. 5(c)).

Further, "TANAKA" is compared with "YAMADA" and "TAMADA" in units of one letter. As a result, the unhideable letter of "TANAKA" is the third letter "N" (see FIG. 5(c)). It is noted that the fifth letter "K" of "TANAKA" is not set as an unhideable letter here, since there are the search conditions: "the number of letters to be selected is one at the beginning", and "the number of unhideable letters is one".

Furthermore, "TAMADA" is compared with "YAMADA" and "TANAKA" in units of one letter. As a result, the one-letter unhideable letter of "TAMADA" does not exist (see FIG. 5(c)).

Therefore, the hideable letter extraction unit 23 increases the number of letters to be selected, from one to two. Accordingly, this hideable letter extraction unit 23 compares "TAMADA" with "YAMADA" and "TANAKA" in units of two letters. First, when a comparison operation is performed about a combination (T, A), which is a combination of the first letter "T" and the second letter "A" of "TAMADA", the letters (T, A) exist aside from "TAMADA" (i.e., in "TANAKA"), and therefore are not set as a combination of unhideable letters (see FIG. 5(d)). Next, when a comparison operation is performed about a combination (T, M), which is a combination of the first letter "T" and the third letter "M" of "TAMADA", the combination of letters (T, M) does not exist aside from "TAMADA", and therefore is set as unhideable letters (see FIG. 5(e)).

As a result, the unhideable letter of "YAMADA" is the first letter "Y", the unhideable letter of "TANAKA" is the third letter "N", and the unhideable letters of "TAMADA" are the letters (T, M), which are the combination of the first letter "T" and the third letter "M" (see FIG. 5(f)).

Then, the hideable letter extraction unit 23 extracts as hideable letters, a plurality of letters constituting each transmission destination's mail address except the unhideable letters.

Although local parts of mail addresses are adopted in the above description, domain parts of mail addresses may be used as well.

In this way, for each mail address, an unhideable letter is determined first, and letters except the unhideable letter are set as hideable letters, so that the unhideable letter becomes a characteristic part by which the mail address can be uniquely determined, and accordingly the possibility to hide this characteristic part is avoided. As a result, a situation where a sender cannot remember an original address when hidden letters are set in the mail address, can be avoided. Furthermore, since there is no dependence on to what extent other mail addresses have been proved (in other words, a hidden letter part can be easily filled with reference only to a mail address in question without using other mail addresses as a clue), an inconvenience that a sender's operation to determine a letter that should be entered in a hidden letter part becomes difficult as if to decipher the puzzle, can be avoided.

After one or more hideable letters for each transmission destination's address are extracted as described above, the process proceeds to a hidden letter selection step where the main control unit 20 commands the hidden letter selection unit 24 to select a hidden letter. In response to this command, the hidden letter selection unit 24 randomly selects a predetermined number of letters to be set as a hidden letter part from the previously extracted one or more hideable letters (Step S2 of the electronic mail delivery program PRG1). At this time, the hidden letter selection unit 24 selects the letters to be set as the hidden letter part such that each mail address is not identical to any other of the plurality of mail addresses even if any letter is entered into a column position expected to be the hidden letter part. This makes it possible to avoid the inconvenience that even though an incorrect letter is entered in a hidden letter part, it coincidentally corresponds to a different correct mail address, and transmission is then permitted.

After the letters to be set as the hidden letter part for each transmission destination's mail address are selected as described above, the process proceeds to a hidden letter presentation step where the main control unit 20 commands the mail address hidden letter presentation unit 21 to present a hidden letter of the mail address. In response to this command, as shown in FIG. 6, the mail address hidden letter presentation unit 21 presents the respective mail address of the transmission destination with a part of the mail address presented as a hidden letter part (in FIG. 6, letters in two positions), in order to make the sender check whether the mail address of the transmission destination is incorrect or not. Thereby, the electronic mail delivery server prompts the sender to enter a correct letter ("n" and "e" in FIG. 6) in the hidden letter part to complete the mail address (Step S3 of the electronic mail delivery program PRG1). In FIG. 6, only one mail address is illustrated from among a plurality of transmission destinations' mail addresses.

When the sender enters the hidden letter part of the mail address, the process proceeds to a selective mail delivery step where the main control unit 20 commands the selective mail delivery unit 22 to perform selective delivery of the mail. In response to this command, the selective mail delivery unit 22 determines whether or not the correct letter is entered in the hidden letter part of the mail address (Step S4 of the electronic mail delivery program PRG1). Then, if the correct letter is entered in the hidden letter part of the mail address, the selective mail delivery unit 22 executes delivery of the electronic mail to the electronic mail receiving server 9 (Step S5 of the electronic mail delivery program PRG1). On the other hand, if the correct letter is not entered in the hidden letter part of the mail address, the selective mail delivery unit 22 stops delivery of the electronic mail to the electronic mail receiving server 9 (Step S6 of the electronic mail delivery program PRG1).

The electronic mail transmission operation is terminated here.

As described above, when an electronic mail is to be transmitted, apart of a transmission destination's mail address is set as a hidden letter part, and the sender is made to enter the letter in the hidden letter part, thereby allowing the sender to think about whether the mail address is correct or not. Therefore, the effectiveness of operation for mail address checking can be improved, and the checking operation can be prevented from losing substance. As a result, erroneous transmission of electronic mails can be prevented, and therefore information leakage can be forestalled.

Furthermore, only a part (a hidden letter part) of a transmission destination's mail address needs to be entered at the time of the electronic mail transmission. Accordingly, the increased burden on a sender is inhibited compared to a case where a whole mail address is to be entered, and furthermore copy and paste of a mail address can be prohibited unlike the case where the whole mail address is to be entered, so that the operation for mail address checking can be prevented from losing substance, in this regard as well.

Other Embodiments of the Invention

In the above described embodiment 1, for extraction of unhideable letters using the predetermined hidden letter part extraction logic, comparison is started from a case where the number of selected letters is one, but comparison may be started from any number of letters more than one without comparison in units of one letter.

Further, in the above description of the embodiment 1, for presenting a plurality of transmission destinations' mail addresses with parts of the addresses presented as hidden letter parts, the predetermined hidden letter part extraction logic is used to extract hideable letters from a plurality of letters constituting each mail address. However, any technique using other than the above described hidden letter part extraction logic may be used in place of or in combination with it, as long as a technique that selects the letters to be set as the hidden letter part such that each mail address is not identical to any other of the plurality of mail addresses even if any letter is entered into a column position expected to be the hidden letter part.

Further, in the above described embodiment 1, the case where an electronic mail is transmitted to a plurality of transmission destinations has been described. However, the present invention can be applied to a case where an electronic mail is transmitted to one transmission destination as well. In this case, the predetermined hidden letter part extraction logic does not need to be used for presenting a transmission destination's mail address with a part of the mail address presented as a hidden letter part, and any letter constituting this mail address may be hidden.

Further, in the above described embodiment 1, the case where a part of a transmission destination's mail address is hidden has been described. However, a part of a transmission source's mail address (a sender's own mail address entered in the sender field 14 in the mail creation screen P1) can also be hidden. Thereby, a wrong outgoing mail address can be prevented in a case where a sender uses a plurality of mail addresses for different purposes (for example, a business-use mail address and a private mail address).

Further, in the above described embodiment 1, the case where a mail is transmitted using SMTP (simple mail transfer protocol) has been described, but the present invention can be applied to transmission of a Web mail as well. In other words, in the present invention, an electronic mail may be an SMTP mail, a Web mail or a mail using other protocols.

Further, in the above described embodiment 1, the electronic mail delivery system 1 has been described to have the electronic mail delivery server 2 in the organization 13, but the electronic mail delivery server 2 does not necessarily need to be placed in the organization 13.

Further, in the above described embodiment 1, the electronic mail delivery system 1 has been described to have the electronic mail delivery server 2 provided as a gateway connecting between the LAN 11 and the Internet 12. However, the electronic mail delivery system 1 may have any configuration as long as it is configured so that an electronic mail to be transmitted from the electronic mail sending server 3 to the electronic mail receiving server 9 surely passes through the electronic mail delivery server 2 on the way. For example, an existing mail transfer server (not show) can be provided between the electronic mail delivery server 2 and the Internet 12.

Further, in the above described embodiment 1, the case where the electronic mail delivery server 2 performs delivery processing of electronic mails has been described. However, such electronic mail delivery processing may be performed by the client 6 instead of the electronic mail delivery server 2, for example, by incorporating a function of the electronic mail delivery processing into a mailer of the client 6 as a plug-in.

Further, in the above described embodiment 1, the electronic mail delivery system 1 has been described in which the electronic mail sending server 3 and the client 6 are interconnected via the LAN 11, and the electronic mail receiving server 9 is connected to the Internet 12. However, instead of the LAN 11 and/or the Internet 12, a communication network such as an extranet using a VAN or a dedicated line provided by a carrier may be used.

Further, in the above described embodiment 1, the case where an electronic mail is transmitted without an attached file has been described. However, it goes without saying that the present invention is applicable regardless of the presence or absence of an attached file.

INDUSTRIAL APPLICABILITY

The present invention can be applied to the above described electronic mail transmission, as well as to input of ID information (a user's mail address) in a case where registration of the user's mail address is asked as ID information that can uniquely identify the user in a membership service on the Internet or the like.

REFERENCE SIGNS LIST

1 Electronic mail delivery system
2 Electronic mail delivery server
3 Electronic mail sending server
6 Client
9 Electronic mail receiving server
11 LAN (Communication network)
12 Internet (Communication network)
13 Organization
20 Main control unit
21 Mail address hidden letter presentation unit
22 Selective mail delivery unit
23 Hideable letter extraction unit
24 Hidden letter selection unit
PRG1 Electronic mail delivery program

The invention claimed is:

1. An electronic mail delivery apparatus to prevent an electronic mail from being delivered with its transmission or distribution destination's mail address mistaken, comprising:
at least one memory storing instructions; and
at least one processor that executes the instructions to cause the electronic mail delivery apparatus to perform:
presenting the mail address with a part of the mail address presented as a hidden letter part; and
executing delivery of the electronic mail to a receiving server of the electronic mail if a correct letter is entered in the hidden letter part of the mail address, and to stop delivery of the electronic mail to the receiving server of the electronic mail if the correct letter is not entered in the hidden letter part of the mail address,
wherein, when the mail address is among a plurality of mail addresses specified as transmission destinations or sources of the electronic mail and to be presented with respective hidden letter parts, a letter to be set as the hidden letter part is selected so as to avoid any of the plurality of mail addresses being identical to any other of the plurality of mail addresses when the plurality of mail addresses are presented with the respective hidden letter parts, even if any letter is entered into a column position expected to be the hidden letter part.

2. The electronic mail delivery apparatus according to claim 1, wherein the at least one processor executes the instructions to cause the electronic mail delivery apparatus to further perform:
when a plurality of mail addresses are specified as transmission destinations or sources of the electronic mail, extracting, for each of the plurality of mail addresses, one or more hideable letters from a plurality of letters constituting a relevant mail address by a predetermined hidden letter part extraction process, and
selecting a letter to be the hidden letter part, from the hideable letters extracted by the extracting.

3. The electronic mail delivery apparatus according to claim 2, wherein the hidden letter part extraction process comprises:
extracting all of mail addresses having the same number of letters from the plurality of mail addresses specified as transmission destinations or sources of the electronic mail; and
for each of the extracted mail addresses,
selecting one letter in an arbitrary column position,
comparing the selected letter with a letter in the same column position of the other mail addresses,
setting the selected letter as an unhideable letter if the same letter as the selected letter does not exist with respect to any other mail addresses, and
extracting, as the hideable letters, a plurality of letters constituting the relevant mail address except the unhideable letter.

4. The electronic mail delivery apparatus according to claim 3, wherein the hidden letter part extraction process comprises:
repeating an operation to change the column position and compare the selected letter with a letter in the same changed column position of the other mail addresses, until the at least one processor determines that the same letter as the selected letter does not exist with respect to any other mail addresses.

5. The electronic mail delivery apparatus according to claim 2, wherein the hidden letter part extraction process comprises:
extracting all of mail addresses having the same number of letters from the plurality of mail addresses specified as transmission destinations or sources of the electronic mail; and
for each of the extracted mail addresses,
selecting a combination of n letters, where n is a natural number, in arbitrary column positions,
comparing the selected combination with a combination of letters in the same column positions of the other mail addresses,
setting the selected combination of letters as unhideable letters if the same combination as the selected combination does not exist with respect to any other mail addresses, and
extracting, as the hideable letters, a plurality of letters constituting the relevant mail address except the unhideable letters.

6. The electronic mail delivery apparatus according to claim 5, wherein the hidden letter part extraction process comprises:
repeating the operation to change the column positions and compare the selected combination with a combination of letters in the same changed column positions of the other mail addresses, until the at least one processor determines that the same combination as the selected combination does not exist with respect to any other mail addresses.

7. The electronic mail delivery apparatus according to claim 6, wherein the hidden letter part extraction process comprises:
repeating an operation to increase the number of characters n included in the selected combination and compare the selected combination with a combination of letters in the same changed column positions of the other mail addresses, until the at least one processor determines that the same combination as the selected combination does not exist with respect to any other mail addresses.

8. The electronic mail delivery apparatus according to claim 5, wherein the hidden letter part extraction process comprises:
repeating an operation to increase the number of characters n included in the selected combination and compare the selected combination with a combination of letters in the same changed column positions of the other mail addresses, until the at least one processor determines that the same combination as the selected combination does not exist with respect to any other mail addresses.

9. The electronic mail delivery apparatus according to claim 1 which is provided in an electronic mail delivery server.

10. An electronic mail delivery method that prevents an electronic mail from being delivered with its transmission or distribution destination's mail address mistaken, comprising:
presenting the mail address specified as the transmission or distribution destination of the electronic mail with a part of the mail address presented as a hidden letter part; and
executing delivery of the electronic mail to a receiving server of the electronic mail if a correct letter is entered in the hidden letter part of the mail address, and stopping delivery of the electronic mail to the receiving server of the electronic mail if the correct letter is not entered in the hidden letter part of the mail address,
wherein, when the mail address is among a plurality of mail addresses specified as transmission destinations or sources of the electronic mail and to be presented with respective hidden letter parts, a letter to be set as the hidden letter part is selected so as to avoid any of the plurality of mail addresses being identical to any other of the plurality of mail addresses when the plurality of mail addresses are presented with the respective hidden letter parts, even if any letter is entered into a column position expected to be the hidden letter part.

11. A non-transitory computer readable storage medium storing instructions that, when executed by at least one processor, cause the at least one processor to perform a method, which prevents an electronic mail from being delivered with its transmission or distribution destination's mail address mistaken, comprising:
presenting the mail address specified as the transmission or distribution destination of the electronic mail with a part of the mail address presented as a hidden letter part; and
executing delivery of the electronic mail to a receiving server of the electronic mail if a correct letter is entered in the hidden letter part of the mail address, and stopping delivery of the electronic mail to the receiving server of the electronic mail if the correct letter is not entered in the hidden letter part of the mail address,
wherein, when the mail address is among a plurality of mail addresses specified as transmission destinations or sources of the electronic mail and to be presented with respective hidden letter parts, a letter to be set as the hidden letter part is selected so as to avoid any of the plurality of mail addresses being identical to any other of the plurality of mail addresses when the plurality of mail addresses are presented with the respective hidden letter parts, even if any letter is entered into a column position expected to be the hidden letter part.

* * * * *